UNITED STATES PATENT OFFICE.

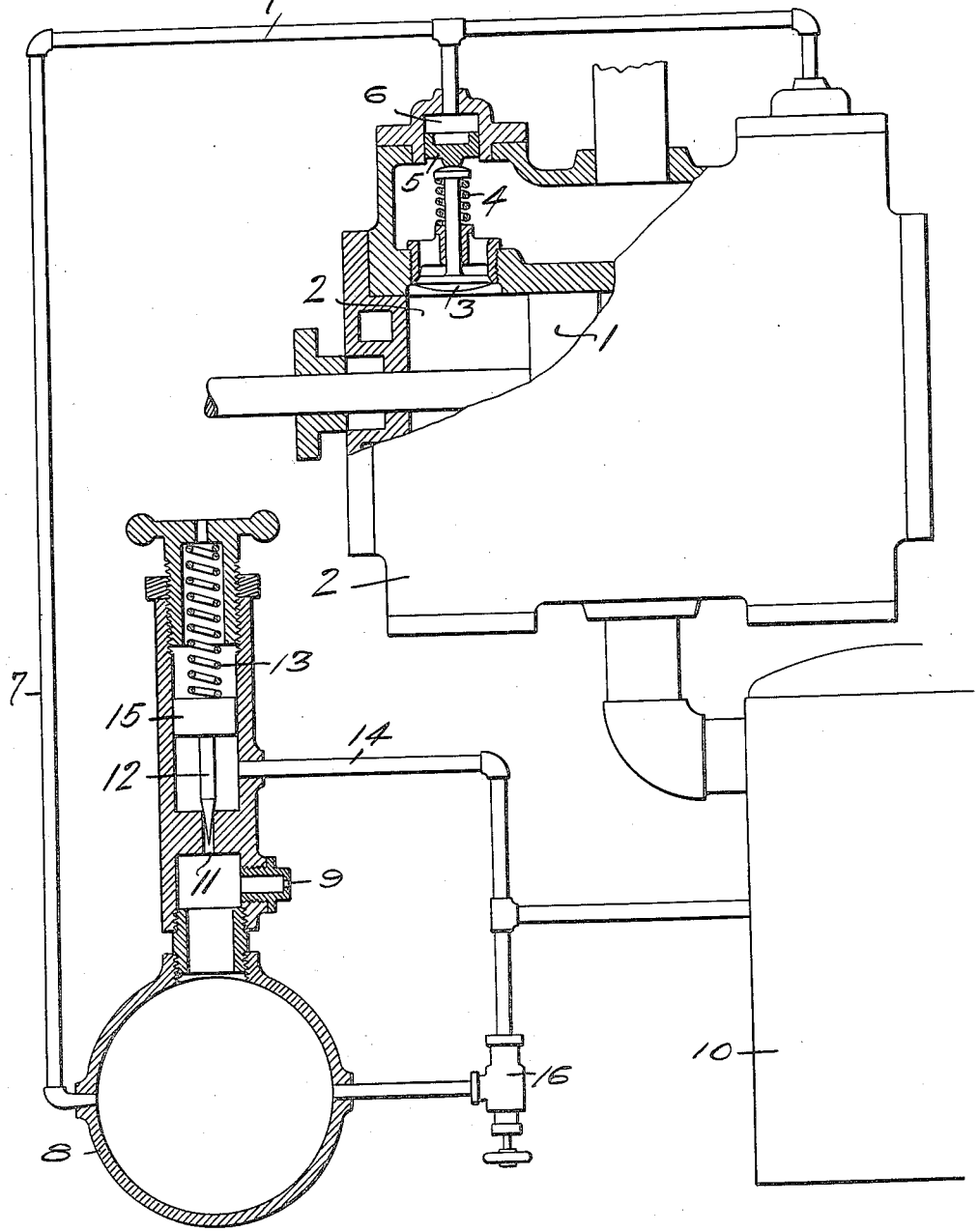

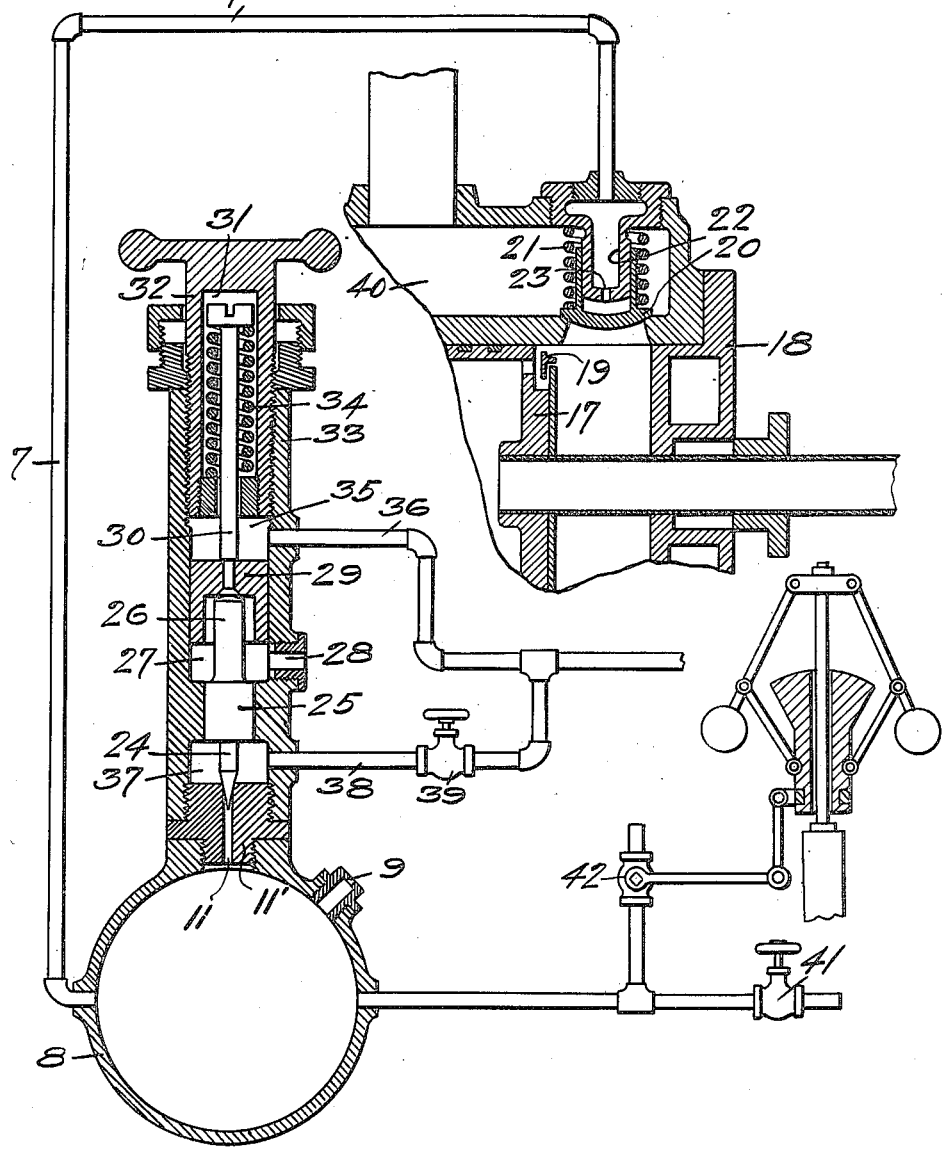

OSCAR R. WIKANDER, OF PITTSBURGH, PENNSYLVANIA.

UNLOADING SYSTEM FOR AIR-COMPRESSORS.

1,150,915.  Specification of Letters Patent.  Patented Aug. 24, 1915.

Application filed February 13, 1914. Serial No. 819,483.

*To all whom it may concern:*

Be it known that I, OSCAR R. WIKANDER, a citizen of the United States, and resident of Pittsburgh, in the county of Allegheny and State of Pennsylvania, have invented a new and useful Improvement in Unloading Systems for Air-Compressors; and I do hereby declare the following to be a full, clear, and exact description thereof.

My invention relates to regulating mechanism in connection with fluid controlling devices, such, for example, as air compressors, blowing engines, vacuum pumps, etc.

One of the objects thereof is to provide very sensitive and efficient regulation of the volume of intake fluid for such devices, so as to make it correspond exactly and at all times to the amount of fluid consumed, thereby in one aspect of the invention maintaining the pressure in the receiver or pipe system practically constant. At the same time, the invention serves to reduce the active power required to operate the apparatus approximately in proportion to the amount of fluid being operated upon. This regulator operates in such a manner that, in case the suction valves of an air compressor, for example, are used for the purpose of regulation, the same are kept open by force during only a part of each discharge stroke and close as soon as the amount of intake air remaining in the cylinder has decreased so as to correspond to the amount of compressed air consumed at the time being. The point of closing or of "cut off" of the suction valves is the same on every stroke as long as the consumption of air remains constant, but varies with varying air consumption so as to maintain a constant receiver pressure.

If the discharge valves are used for the regulation they remain forced open during only a part of the following suction stroke, thus distinguishing from known constructions, and close as soon as the amount of compressed air returned into the pump cylinder is so great that it, after expansion to intake pressure, will leave sufficient room for fresh air to enter the cylinder, during the last part of the suction stroke, to such an amount as to correspond to the consumption of compressed air at the time being. The point of closing or "cut off" is the same on every suction stroke as long as the consumption of air remains constant, but varies with varying consumption of compressed air so as to maintain a practically constant receiver pressure.

The method, whereby the closing of the automatic valves at an adjustable point during the return flow of the air or gas is effected, consists simply in a very gradual regulation of the force holding said valves open against the pressure exerted by their springs. The return flow of the elastic fluid through the suction valves will, on account of the throttling action of the latter, cause an increase of pressure in the cylinder tending to close said valves, and this pressure will effect such closure when the piston has reached a point in its stroke, the location of which is dependent upon said throttling action. The less intense this action, the more said point will advance toward the end of the stroke. (It should be said that the inventor uses the term "stroke" here to designate movement of the piston in one direction; or, a single movement of the piston from one end of the cylinder to the other.) The return flow of the elastic fluid through the discharge valves will, on account of the throttling action of the latter, cause a decrease of pressure in the cylinder, and this decrease will effect the closure of said valves at a point in the stroke, the location of which advances toward the end of the stroke in accordance with the decreasing intensity of said throttling action. The valves will close where this increase or decrease of pressure, supported by the pressure of the valve springs, balances or overcomes the force applied for the purpose of regulation.

The present invention covers broadly the application of the above outlined method of regulation of the volume of an elastic fluid passing through any kind of reciprocating machines such as air compressors, blowing engines, vacuum pumps, etc. It is also intended to cover the application of said method to the regulation of the volume of an unyielding fluid, such as water, passing through a reciprocating pump. In the latter case, it is, however, necessary to regulate the suction as well as the discharge valves if we desire to cover the entire range of regulation from no load to full capacity. While the volume ordinarily will be regulated so as to maintain a constant pressure in the discharge tank or pipe system, it should be understood that said regulation can be controlled by other factors as well, such as speed or power consumption of the prime mover.

In order to clearly illustrate the spirit of this invention, a few applications of same to special cases will be described in detail.

Figure 1 represents an ordinary puppet valve air compressor, provided with automatic volume regulation acting upon the suction valves so as to keep the receiver pressure constant. Fig. 2 represents a piston inlet type of air compressor, provided with automatic volume regulation acting upon the discharge valves, so as to keep the receiver pressure constant, and an additional device so as to unload the air compressor completely, should the speed of the prime mover fall below a certain limit.

Referring to Fig. 1, the piston 1 works in the cylinder 2 of a power driven air compressor. The suction valves 3 are provided with springs 4, which tend to close them, and with pistons 5 which are acted upon by the air pressure in the cylinder 6. These cylinders are connected by means of a pipe 7 to the auxiliary tank 8. This tank communicates with the atmosphere through a leak 9 and with the main reservoir 10, through the opening 11, which is closed by means of the pilot valve 12 as soon as the force of the adjustable spring 13 overcomes the air pressure of the reservoir 10 acting through the pipe 14 on the bottom of the valve piston 15. An adjustable needle valve 16 can be arranged so as to obtain a constant leak from the main to the auxiliary reservoir, thereby preventing the pressure in the latter from decreasing below a certain value. When the compressor is working at a constant partial load, the valve 12 will allow some air to enter the auxiliary tank 8 through the opening 11 and the same quantity of air will escape through the leak 9, thereby keeping the pressure in the reservoir 8 and the pressure acting upon the pistons 5 in the cylinders 6, constant. The suction valves will close at such a point of the discharge stroke as to compress exactly the quantity of air consumed, the pressure in the main tank 10 remaining constant. A change in the consumption of air will cause a slight increase or decrease of the pressure in the main tank 10 and the quantity of air entering the reservoir 8 through the opening 11 will increase or decrease, thereby changing the pressure in said reservoir and the cut off of the suction valves until new conditions of equal supply and consumption of compressed air at a slightly increased or decreased tank pressure are established. A certain pressure in the auxiliary tank 8 will balance the action of the valve springs to such an extent as to oppose a minimum of resistance to the intake air and at this pressure the compressor will produce its maximum volumetric efficiency. The needle valve 16, which is adjusted by hand, can be set so as to admit constantly so much air to the auxiliary tank 8 as to produce said pressure. If more air is admitted through the valve 16, the pressure in the auxiliary reservoir will always remain above said valve, thereby permanently reducing the capacity of the compressor and only allowing the amount of intake air to vary with the consumption of compressed air as long as the latter remains below said reduced capacity.

Referring to Fig. 2 the piston 17 works in the cylinder 18 of an air compressor, said piston having inlet valve 19. The discharge valves 20 which are preferably of cylindrical form, are provided with springs 21 which tend to close them. These cylindrical valves are acted upon by the air pressure between the lower ends of said valves and the ends of the plungers 22 upon which the valves slide. Through holes 23 in said plungers and through the pipe 7 these cylinder valves 20 are connected to the auxiliary tank 8, and said tank communicates with the atmosphere through the leak 9 and with the main reservoir through the opening 11 which is controlled by the needle valve 24. This needle valve is mounted on the piston 25 which piston has an extension 26 extending into a chamber 27 which chamber communicates with the atmosphere through an opening 27. Above the piston 25 is a second piston 29 having a headed stem or rod 30 which extends within a chamber 31 of an adjusting screw 32 adjustable in the piston casing 33. A spring 34 surrounding the stem 30 normally has a tendency to raise the piston 29. The chamber 35 between the piston 29 and the screw plug 32 communicates with the main pressure tank by a pipe 36. Also the chamber 37 between the lower end of the piston 25 and the valve seat 11' communicates with the main pressure tank through a pipe 38 having a regulating valve 39 therein. A needle point globe valve 41 allows enough of the pressure air contained in the auxiliary tank to escape to the atmosphere so as to unload the compressor by hand if desired. A similar needle point valve 42 can be operated by means of a speed regulator so as to increase or decrease the pressure in the auxiliary reservoir 8, and the amount of intake air to the compressor in case of increase or decrease in speed of the prime mover. An increase or decrease in speed of the latter is, as a rule, produced by a decrease or increase of the power consumption, and the latter factor can, therefore, indirectly by the same means be used for the control of the amount of intake air to the compressor.

When the compressor is working at a constant partial load the air under pressure from the main tank will enter the chamber 35 through the pipe 36 and counteract the tendency of the spring 34 to raise the piston 29, said piston will therefore bear upon the extension 26 of the piston 25 carrying the needle valve 24 against the pressure entering the chamber 37 through the pipe 38 to such an extent that the air will enter the auxiliary chamber 8 through the passage 11 at the same rate as it escapes through the leak 9 thereby keeping constant the pressure in the reservoir 8 which through the pipe 7 and opening 23 acts upon the cylindrical valve 20. Under these conditions the pressure in the auxiliary chamber 8 will be somewhat less than that in the main tank and in the passage 40 leading from the cylinder 18 to said main tank. Owing to this low pressure thus created in the plungers 22 the discharge valves will be kept open during part of the following suction stroke, and allow a certain amount of compressed air to reënter the cylinder from the outlet passage 40 and expand in the cylinder to intake pressure. During the remaining part of the suction stroke, the amount of fresh air drawn into the cylinder will exactly correspond to the consumption of compressed air at the time being and the air pressure in the main tank will remain constant. Assuming now that the consumption of compressed air is increased, a slight drop of pressure in the main tank will result and the spring 34 will overcome the effect of the tank pressure on the piston 29 and will allow said piston to rise thereby permitting the piston 25 carrying the needle valve 24 to rise and permitting a greater quantity of air from the main tank to enter the auxiliary chamber 8. The pressure in the auxiliary tank 8 will increase and acting through the pipe 7 and hole 23 of the plunger 22 will cause the valves 20 to seat at an earlier point of the suction stroke thereby increasing the volume of fresh air drawn into the compressor through the intake valve 19 until it equals the increased consumption of compressed air taken from the main tank, the pressure in the tank being slightly reduced. In case of a decrease in the consumption similar action will take place and a new equilibrium between supply and consumption will be established after a slight increase of the tank pressure. In case of compound or multiple air compressors, each stage has its own regulator. Due to the fact that the different stages of multiple stage air compressors may operate at different cut-offs, the present system of regulation is exceedingly flexible and the generally intricate problems arising in connection with the regulation of such compressors is easily solved. While almost any problem of regulation of air compressors, blowing engines, vacuum pumps, etc., can be solved in applying the above disclosed principle, we think that the above three typical cases will sufficiently illustrate the methods involved.

What I claim is:

1. In combination with a fluid controlling device, which comprises a cylinder, a piston and automatic inlet and outlet valves, of means for applying to valves of one set such controllably variable yielding pressure that they will be actuated upon that stroke of the piston which otherwise would be idle with respect to the valves of said set at a time governed by the intensity of said pressure.

2. In combination with a fluid controlling device, which comprises a cylinder, a piston and automatic inlet and outlet valves, of means tending to close said valves, and means for applying to valves of one set such controllably variable yielding pressure as to counteract the action of said closing means and actuate the valves of said set during that stroke of the piston which otherwise would be idle with respect to the valves of that set at a time governed by the intensity of said pressure.

3. In combination with a fluid controlling device, which comprises a cylinder, a piston and automatic inlet and outlet valves, of means tending to close said valves and fluid operated means for applying to valves of one set such controllably variable yielding pressure as to counteract the action of said closing means and actuate the valves of said set during that stroke of the piston which otherwise would be idle with respect to the valves of that set at a time governed by the intensity of said pressure.

4. In combination with a fluid controlling device, which comprises a cylinder, a piston and automatic inlet and outlet valves, of means tending to close said valves and means comprising an auxiliary pressure tank containing a fluid under pressure and having means connected with said valves, whereby the fluid of said tank may apply to valves of one set such controllably variable yielding pressure as to counteract the action of said closing means and actuate the valves of said set during that stroke of the piston which otherwise would be idle with respect to the valves of that set at a time governed by the intensity of said pressure.

5. In combination with a fluid controlling device, which comprises a cylinder, a piston, automatic inlet and outlet valves, of means exposed to the pressure in the outlet pipe for applying to valves of one set such controllably variable yielding pressure that they will be actuated upon that stroke of the piston which otherwise would be idle with respect to the valves of that set at a time governed by the intesity of the pressure in said outlet pipe.

6. In combination with a fluid controlling device, which comprises a cylinder, a piston, automatic inlet and outlet valves, of means, influenced by the speed of the prime mover, for applying to valves of one set such controllably variable yielding pressure that they will be actuated upon that stroke of the piston which otherwise would be idle with respect to the valves of that set at a time governed by the degree of said speed.

7. In combination with a fluid controlling device, which comprises a cylinder, a piston, automatic inlet and outlet valves, of means, influenced by the power consumption of said device, for applying to valves of one set such controllably variable yielding pressure that they will be actuated upon that stroke of the piston which otherwise would be idle with respect to the valves of that set at a time governed by the amount of said power consumption.

8. In a fluid controlling device, the combination of a cylinder, a piston, inlet and outlet valves, and variable controllable means to actuate any or all of the outlet valves during that stroke of the piston which otherwise would be idle with respect to said valves at a time dependent on the control of said means.

9. In a fluid controlling device, the combination of a cylinder, a piston, inlet and outlet valves, and means, exposed to the pressure in the outlet pipe, to actuate any or all of the outlet valves during that stroke of the piston which otherwise would be idle with respect to said valves at a time governed by the intensity of the pressure in said outlet pipe.

10. In a fluid controlling device, the combination of a cylinder, a piston, inlet and outlet valves, and means, influenced by the speed of said device, to actuate any or all of the outlet valves during that stroke of the piston which otherwise would be idle with respect to said valves at a time governed by the degree of said speed.

11. In a fluid controlling device, the combination of a cylinder, a piston, inlet and outlet valves, and means, influenced by the power consumption of said device, to actuate any or all of the outlet valves during that stroke of the piston which otherwise would be idle with respect to said valves at a time governed by the amount of said power consumption.

In testimony whereof, I the said OSCAR R. WIKANDER, have hereunto set my hand.

OSCAR R. WIKANDER.

Witnesses:
  JOHN F. WILL,
  J. R. KELLER.